United States Patent
Ee

(10) Patent No.: US 9,875,759 B1
(45) Date of Patent: Jan. 23, 2018

(54) DUAL STAGE ACTUATED SUSPENSION HAVING SHEAR-MODE PZT ACTUATORS FOR ROTATING GIMBAL TONGUE

(71) Applicant: Magnecomp Corporation, Murrieta, CA (US)

(72) Inventor: Kuen Chee Ee, Chino, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 15/249,436

(22) Filed: Aug. 28, 2016

Related U.S. Application Data

(60) Provisional application No. 62/216,941, filed on Sep. 10, 2015.

(51) Int. Cl.
*G11B 5/596* (2006.01)
*G11B 5/48* (2006.01)
*G11B 5/60* (2006.01)

(52) U.S. Cl.
CPC .............. *G11B 5/483* (2015.09); *G11B 5/486* (2013.01); *G11B 5/4833* (2013.01); *G11B 5/596* (2013.01); *G11B 5/6005* (2013.01)

(58) Field of Classification Search
None
See application file for complete search history.

(56) References Cited

U.S. PATENT DOCUMENTS

| | | | |
|---|---|---|---|
| 6,704,158 B2 | 3/2004 | Hawwa et al. | |
| 7,061,724 B2 | 6/2006 | Koganezawa | |
| 7,183,696 B2 | 2/2007 | Yamazaki et al. | |
| 8,125,741 B2 | 2/2012 | Shelor | |
| 8,254,065 B2 | 8/2012 | Inoue et al. | |
| 8,879,210 B1 | 11/2014 | Hahn et al. | |
| 2001/0038515 A1* | 11/2001 | Koganezawa et al. | ................... G11B 5/5552 360/294.4 |
| 2010/0246071 A1 | 9/2010 | Nojima et al. | |

OTHER PUBLICATIONS

Koganezawa et al., Dual-Stage Actuator System for Magnetic Disk Drives Using a Shear Mode Piezoelectric Microactuator, IEEE Transactions on Magnetics, vol. 35, No. 2, p. 988-992, Mar. 1999.*
Koganezawa et al., Development of Shear-Mode Piezoelectric Microactuator for Precise Head Positioning, Fujitsu Sci. Tech. J.,37,2, p. 212-219, Dec. 2001.*

* cited by examiner

*Primary Examiner* — Craig A. Renner
(74) *Attorney, Agent, or Firm* — Nixon Peabody LLP

(57) ABSTRACT

A dual stage actuated (DSA) suspension uses two shear-mode PZT microactuators to finely position the head slider. The bottom surfaces of the PZTs are affixed to the flexure, and the PZT top surfaces move forward and backward, respectively, in push-pull fashion when the PZTs are activated. Flexible connector arms attach the tops surfaces of the PZTs to the gimbal tongue such that activating the PZTs causes the gimbal tongue to rotate, with the connector arms acting as levers to magnify the motion such that a relatively small shear movement of the PZTs results in a significantly larger lateral movement of the head slider across the data disk.

20 Claims, 7 Drawing Sheets

DUAL STAGE ACTUATED SUSPENSION HAVING SHEAR-MODE PZT ACTUATORS FOR ROTATING GIMBAL TONGUE

CROSS-REFERENCE TO RELATED APPLICATIONS

This application claims priority from U.S. provisional patent application No. 62/216,941 filed Sep. 10, 2015, the disclosure of which is incorporated by reference as if set forth fully herein.

BACKGROUND OF THE INVENTION

1. Field of the Invention

This invention relates to the field of suspensions for disk drives. More particularly, this invention relates to the field of a dual stage actuated suspension having shear-mode PZT actuators that rotate the gimbal tongue.

2. Description of Related Art

In a typical disk drive assembly, the suspension is the part that holds the read/write head over the correct position on a spinning data disk such as a magnetic data medium or optical data medium containing a number of concentric data tracks. The suspension typically includes a beam portion or load beam, and a flexure that includes a gimbaled portion, with the load beam typically mounted to a baseplate at the proximal end of the suspension, and the flexure mounted at the distal end of the load beam. The read/write head, or head slider, is affixed to the gimbaled portion of the flexure so that it can pitch and roll freely. The suspension is typically mounted at the end of an actuator arm, with the actuator arm moved by a voice coil motor (VCM).

Dual stage actuated (DSA) suspensions are well known. In a DSA suspension, the suspension is not only activated by the voice coil motor which moves the entire suspension, but an additional actuator is placed on the suspension itself for effecting fine movements of the head slider in order to keep it properly aligned over the correct data track on the spinning disk. The secondary actuator(s) provide finer control and higher bandwidth of the servo control loop than does the voice coil motor alone, which is only capable of effecting relatively coarse, slow movements of the suspension and hence the head slider. The secondary actuator(s) are sometimes referred to as milliactuators if they are mounted near the proximal end of the suspension, and microactuators if they are mounted near the distal end of the suspension. As used herein, the term "microactuator" will be used as an umbrella term that refers to any small actuator motor that is located on the suspension itself. A piezoelectric element, sometimes referred to simply as a PZT, is often used as the microactuator motor, although other types of microactuator motors are possible.

In order to achieve the best performance in a suspension, it is important to maximize the stroke length in the microactuation mechanism. The term "stroke length" is a shorthand expression for the distance that the read/write head moves radially across a data disk per unit of voltage input to the microactuator motor.

Linear-mode PZTs are commonly used as microactuators on DSA suspension. U.S. Pat. No. 8,879,210 issued to Hahn et al. is an example of a DSA suspension that uses linear-mode PZTs to position the read/write head. The two PZTs act in push-pull fashion to rotate the head slider and thus to precisely position its read/write transducers.

$D_{31}$ is the transverse piezoelectric coefficient of a linear-mode piezoelectric device; it represents the amount of linear expansion a PZT device undergoes in the transverse direction (i.e., normal to the electric field gradient) when an activation voltage is placed across the device's electrodes. $D_{33}$ is the longitudinal piezoelectric coefficient; it represents the amount of linear expansion of a PZT in the longitudinal direction (i.e., in the direction of the electric field gradient) when an activation voltage is placed across the device's electrodes.

SUMMARY OF THE INVENTION

In addition to linear-mode PZTs, shear-mode PZTs exist. In a shear-mode PZT, in response to an activation voltage the PZT deforms in shear. For example, the top surface moves horizontally relative to the bottom surface. $D_{15}$ is the shear piezoelectric coefficient of a shear-mode PZT. The present invention employs a shear-mode PZT operating in the $d_{15}$ mode, or shear mode, in order to maximize the stroke length.

According to an exemplary embodiment, first and second shear-mode PZTs operating in the $d_{15}$ mode are mounted on a flexure. The PZTs may be mounted on separate flexible outrigger arms than can flex in the vertical dimension at least somewhat independently. Respective first and second flexible connector arms extend from the PZTs to the gimbal tongue. When the PZTs are activated, the two PZTs act in opposite directions in push-pull fashion, thereby pushing on and pulling respectively opposite sides of the gimbal tongue through the respective connector arms, to rotate the gimbal tongue together with the head slider that is mounted on the gimbal tongue. Rotating the gimbal tongue positions the read/write data transducers that are embedded in the head slider, usually close to the distal end of the slider, over the desired data track on the data disk. The mechanical coupling from the PZTs to the head slider acts as a lever to magnify the shear movement of the PZTs into significantly greater spatial displacement at the read/write transducers.

The gimbal tongue may be supported by only the flexible connectors, with the freedom of movement provided by the flexible connectors combining with the freedom of movement provided by the independently flexing flexible outrigger arms to provide the desired gimbaling action at the head slider in the pitch and roll directions.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

As used herein, the "bottom" side of a suspension is the side on which the read/write head is mounted, i.e., the side which faces the data disk, and the "top" side is the side opposite the bottom side. The "proximal" end of a suspension or load beam is the end that is supported, i.e., the end nearest to the base plate which is swaged or otherwise mounted to an actuator arm. The "distal" end of a suspension or load beam is the end that is opposite the proximal end, i.e., the "distal" end is the cantilevered end.

Figure 1:
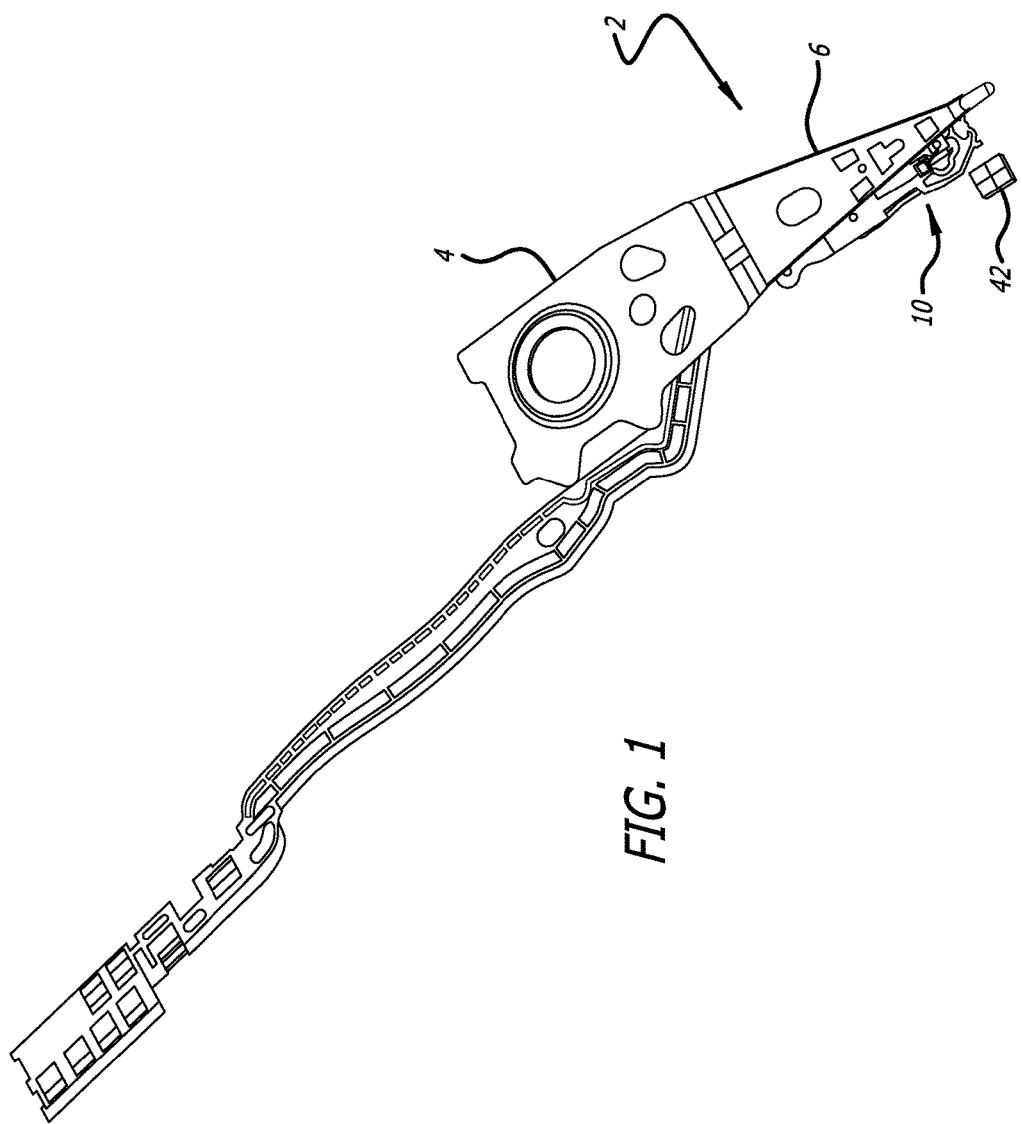
FIG. 1 is a top oblique view of a suspension according to an exemplary embodiment of the invention.

FIG. 1 is a top oblique view of a suspension 2 according to an exemplary embodiment of the invention. Suspension 2 includes: a base plate 4; and a load beam 6, or beam portion, or simply beam extending from baseplate 4 and attached to baseplate 4 via hinge springs at a proximal end of load beam 6. A trace gimbal assembly (TGA) 10 which carries head slider 42 is attached to load beam 6 at the distal end of load beam 6.

Figure 2:
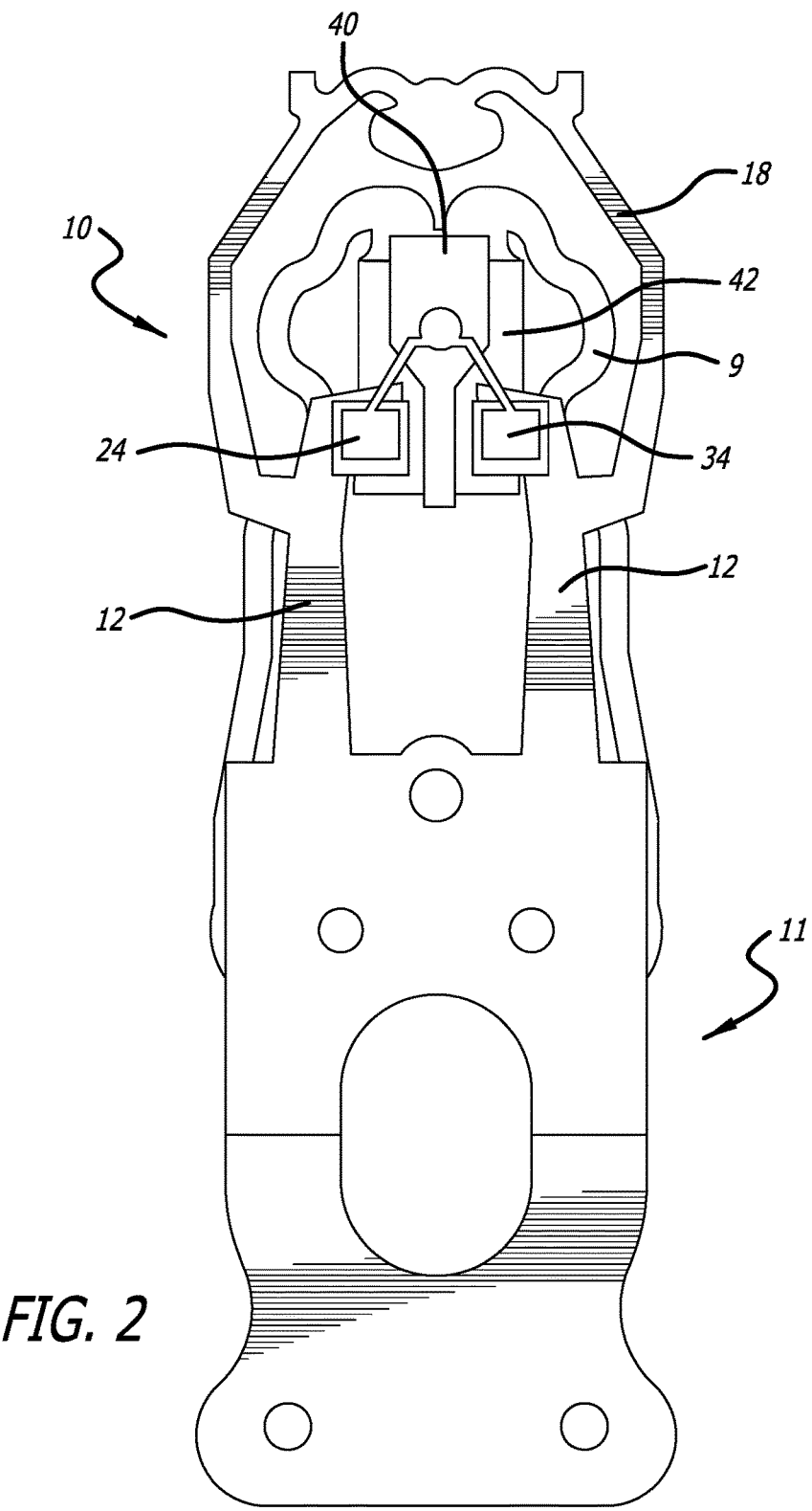
FIG. 2 is a top plan view of the trace gimbal assembly of the suspension of FIG. 1.
Figure 3:
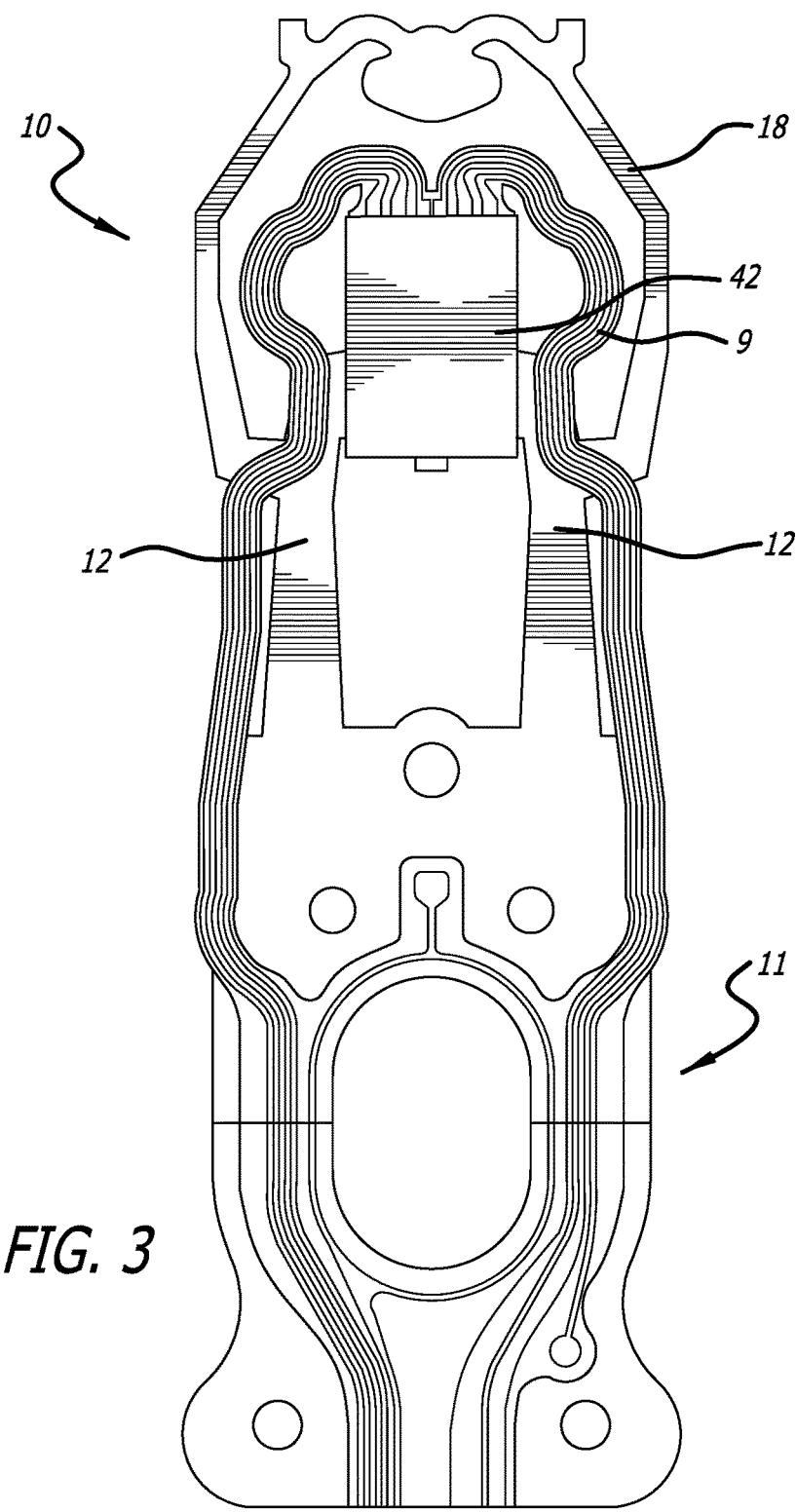
FIG. 3 is a bottom plan view of the trace gimbal assembly of FIG. 2.

FIG. 2 is a top plan view of TGA 10 of the suspension 2 of FIG. 1, and FIG. 3 is a bottom plan view thereof. TGA 10 includes flexure 11 and flexible circuit 9. Flexible circuit 9 includes layers of a dielectric insulator which is typically polyimide, and electrical signal traces formed of a conductor which is typically copper or copper alloy. Both load beam 6 and the flexure 11 are typically made of stainless steel, and are typically welded together using laser spot welding. Flexure 11 includes two elongate flexible outrigger arms 12 on the left and right lateral sides of the flexure, and outer gimbal ring 18. The proximal end of flexure 11 is connected to load beam 6 and is therefore relatively fixed. Because outrigger arms 12 are thin and flexible, their distal ends can move vertically relative to one another relatively freely as the outrigger arms 12 flex up and down and without any direct rigid coupling between those distal ends. Head slider 42 is bonded and rigidly affixed to gimbal tongue 40 such as by epoxy adhesive. Flexible circuit 9 carries read/write signals and data tracking servo control loop signals to and from head slider 42.

Figure 4:
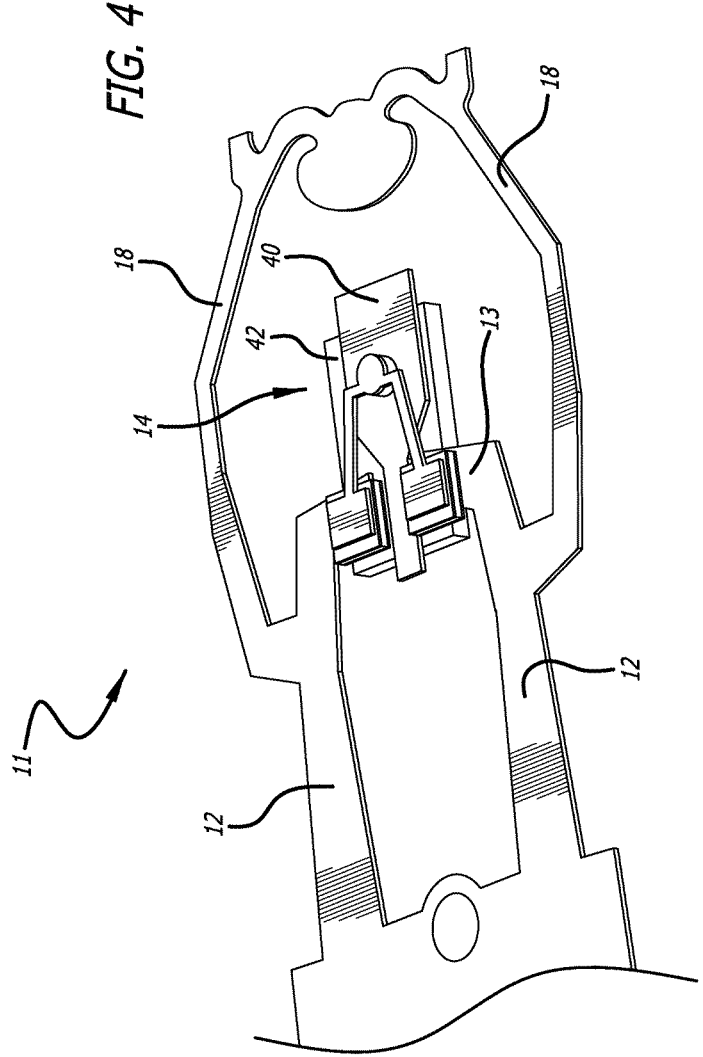
FIG. 4 is a top oblique view of the flexure gimbal of FIG. 2.

FIG. 4 is a top oblique view of the distal portion of flexure 11 of FIG. 2. Flexible circuit 9 is not shown for clarity of illustration. Outrigger arms 12 include generally laterally extending portions 13. Gimbal tongue 40 defines a gimbaled portion 14 of the TGA 10 to which head slider 42 is mounted, and hence gimbal tongue 40 also defines a gimbaled portion of suspension 2.

Figure 5:
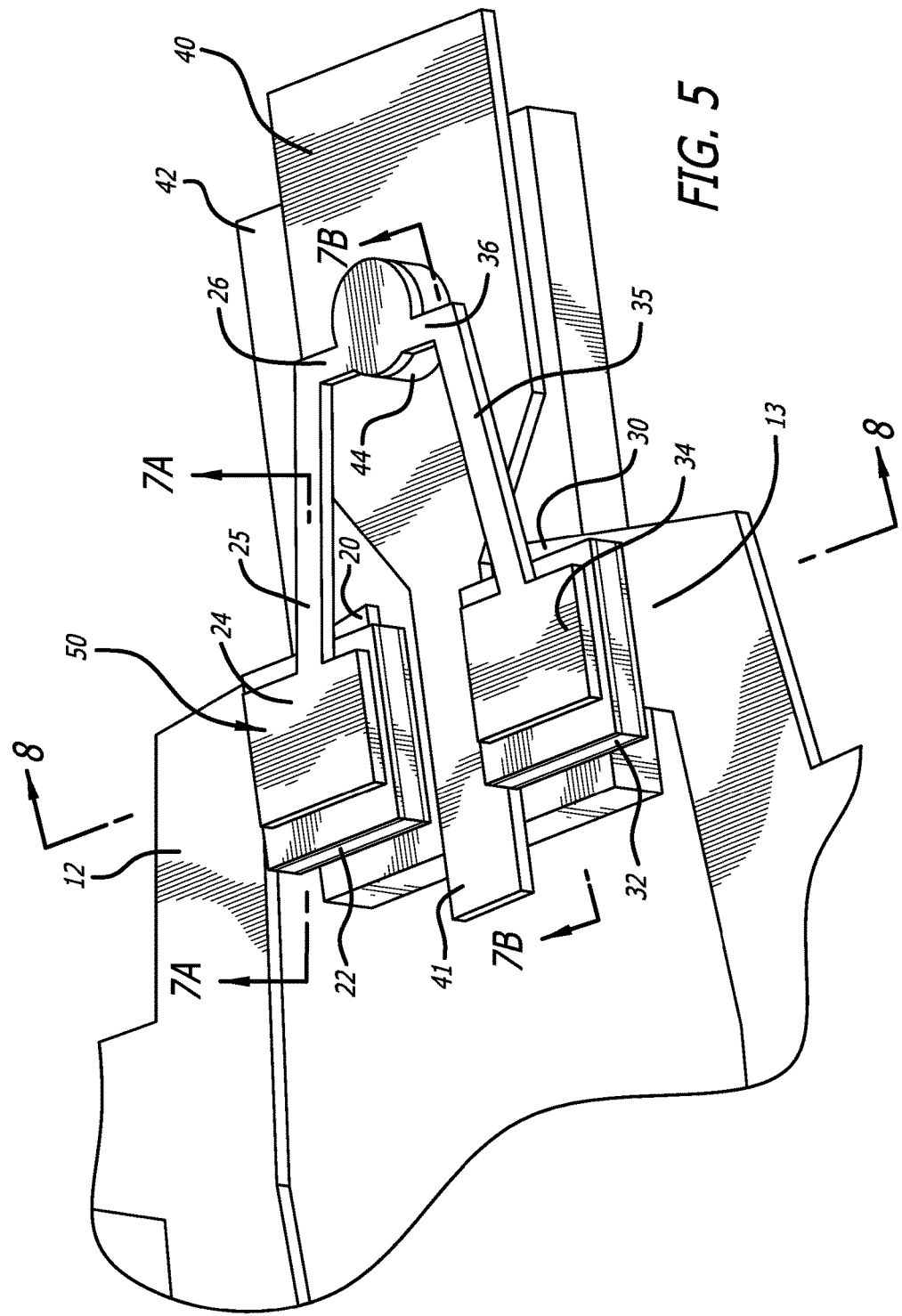
FIG. 5 is a closeup of the flexure gimbal of FIG. 4.

FIG. 5 is a closeup of the flexure gimbal of FIG. 4, showing the PZTs and their mechanical coupling to gimbal tongue 40 in detail. Flexible outrigger arms 12 include generally laterally extending portions 13, portions of which define bases 20, 30 on which one, and preferably two, piezoelectric devices 22, 32 are mounted. The piezoelectric devices 22, 32 define microactuators, which will be referred to simply as PZTs. PZTs 22, 32 operate in the $d_{15}$ mode; such PZTs are referred to as shear-mode PZTs.

PZTs 22, 32 are attached at the distal ends of respective flexible outrigger arms 12. In the preferred embodiment there is no direct mechanical connection extending between the two PZTs or tying them closely together. The PZTs 22, 32 thus enjoy a certain amount of freedom of movement such that one PZT 22 can move vertically relative to the other PZT 32.

PZTs 22, 32 can be bonded directly to flexible outrigger arms 12. Because flexure 11 is typically made of stainless steel which is electrically conductive and is grounded through load beam 6, if PZTs 22, 32 are bonded to flexible outrigger arms 12 using conductive adhesive such as epoxy containing silver particles, then assuming that the bottom surfaces of the PZTs are electrodes, the bottom electrodes are thus grounded; the actuating drive voltage for the PZTs would be supplied to the drive electrode which would normally be located on the top surface of the PZTs. If the PZTs are electrically isolated from flexible outrigger arms 12 such as via the insulating layer of the TGA 10, then either the top or bottom surface can be the drive electrode, with the other surface being the ground electrode. Although normally the top and bottom surfaces of the PZTs constitute the two electrodes for the device, other possibilities exist including PZTs having wrap-around electrodes such that both electrodes are accessible from a single face of the PZT.

The actual electrical connections to the PZTs 22 and 32 are omitted for clarity of illustration. Examples of electrical connections to PZTs in suspensions can be seen in, e.g., U.S. Pat. No. 8,254,065 to Inoue et al.; U.S. Pat. No. 9,251,817 to Hahn et al.; U.S. Pat. No. 8,810,972 to Dunn; and U.S. Pat. No. 8,189,301 to Schreiber. The actual connections of the PZT actuating voltage and ground to the PZTs is a matter of design choice; a number of possibilities would be apparent to the designer of ordinary skill in the art of suspension design.

PZTs 22, 32 are coupled to gimbal tongue 40 via flexible connector 50. Connector 50 includes left connector arm 24 which includes generally longitudinally extending portion 25 and generally laterally extending portion 26, and right connector arm 34 which includes generally longitudinally extending portion 35 and generally laterally extending portion 36. Connector arms 24, 34 may be bonded to PZTs 22, 32 such as by epoxy adhesive. Preferably connector 50 is unitarily formed of a single piece of spring material such as stainless steel. The generally longitudinally extending portions 25, 35 are angled slightly inwardly, preferably at an angle of 0-30°, so that as they extending distally from the PZTs they also extend slightly inwardly toward a central longitudinal axis of the flexure and of the suspension. In the embodiment shown, connector 50 attaches to gimbal tongue 40 at a single location that corresponds to spacer or standoff 44, and gimbal tongue 40 is supported only by connector 50, such that connector 50 including its flexible connector arms 24, 34 provide the sole mechanical support for gimbal tongue 40. The freedom of movement provided by flexible outrigger arms 12 combined with the freedom of movement provided by flexible connector 50 provides a gimbaling action that allows head slider 42 to pitch and roll freely to accommodate vibrations, inertial events such as bumping, and irregularities in the disk platter surface as the disk platter moves underneath the head slider. Preferably the generally longitudinally extending portions 25, 35 of connector 50 are narrower in the lateral direction than PZTs 22, 32. More preferably, portions 25, 35 of connector 50 are less than one third as wide as the lateral widths of each of the PZTs 22, 32.

In the embodiment, generally laterally extending portions 26, 36 of connector 50 are connected to gimbal tongue 40 via standoff 44 which separates connector 50 from gimbal tongue 40 by approximately the same distance as thicknesses of PZTs 22, 32, such as a distance that is 50%-150% of the thicknesses of the PZTs. Standoff 44 could be conductive epoxy to electrically connect to the tongue. Alternatively, connector 50 and gimbal tongue 40 could be welded together. If connector 50 comprises an electrically conductive material such as stainless steel and is bonded to the PZTs using conductive adhesive such as conductive epoxy, then a single common PZT driving voltage could be supplied to one of the PZTs' top electrodes, and connector 50 will carry that driving voltage to the other PZT's top electrode. Thus, using connector 50, only a single driving voltage connection is necessary in order to drive both PZTs.

Figure 6:
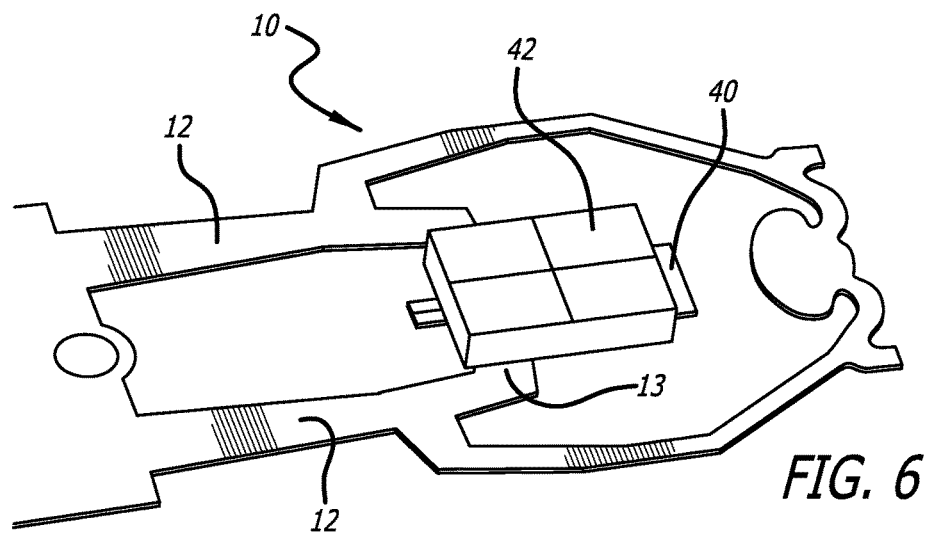
FIG. 6 is a bottom oblique view of the flexure gimbal of FIG. 4

FIG. 6 is a bottom oblique view of the flexure gimbal of FIG. 4.

Figure 8:
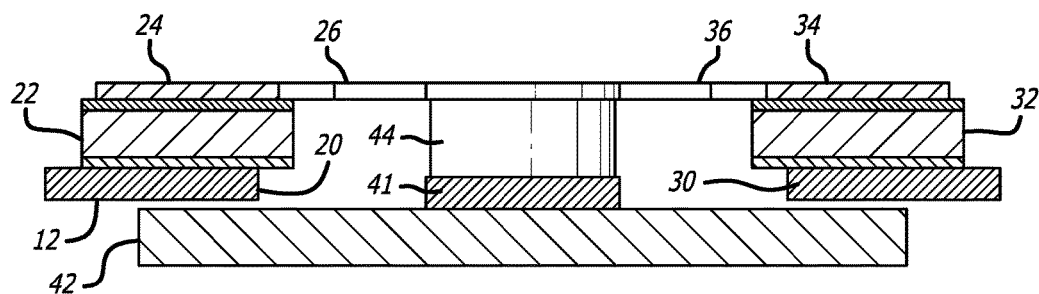
FIG. 8 is a side sectional view of the flexure of FIG. 5 taken alone section line 8-8.

FIG. 8 is a side sectional view of the flexure of FIG. 5 taken alone section line 8-8.

Figure 7A:
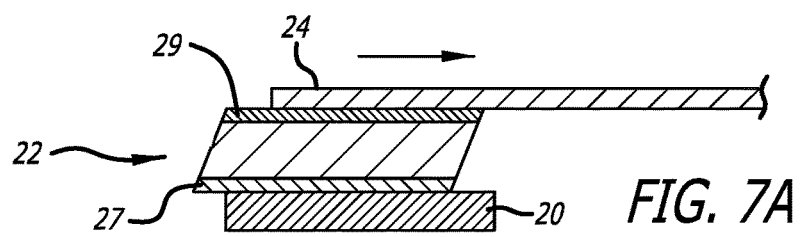
FIG. 7A is a cross sectional view of the flexure of FIG. 5, taken along section line 7A-7A, when the PZTs are activated.
Figure 7B:
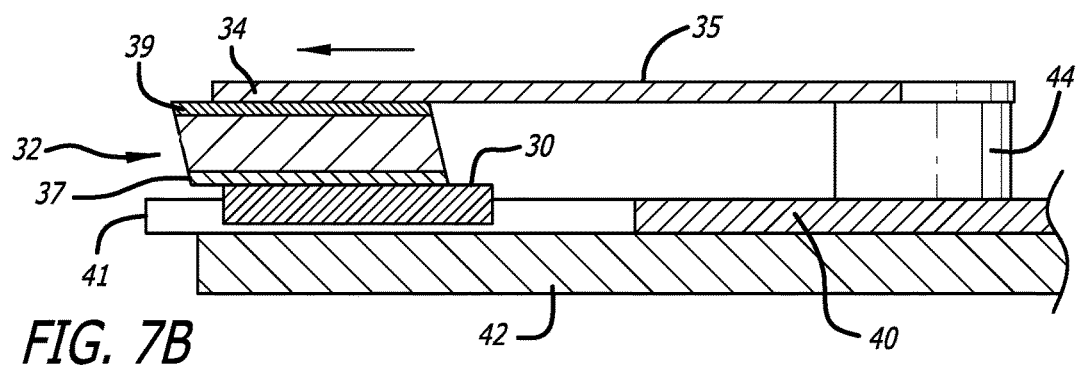
FIG. 7B is a cross sectional view of the flexure of FIG. 5, taken along section line 7B-7B, when the PZTs are activated.

FIG. 7A is a cross sectional view of the flexure of FIG. 5, taken along section line 7A-7A, when the PZTs are activated, and FIG. 7B is a cross sectional view of the flexure of FIG. 5 taken along section line 7B-7B, when the PZTs are activated. When PZTs 22, 32 are activated by applying a voltage across their electrodes 27/29 and 37/39, PZT 22 moves in shear, i.e. in its $d_{15}$ mode, with its top surface 29 moving in a more distal direction while PZT 32 moves in shear with its top surface 39 moving in a more proximal direction, as shown in FIGS. 7A and 7B, or vice versa. Connector 50 defines a mechanical coupling that couples the push-pull movement of PZTs 22, 32 into rotational movement of gimbal tongue 40 and hence of head slider 42. Connector 50, and in particular the generally longitudinally extending portions 25, 35, act as lever arms to multiply the relatively small longitudinal movements of top faces 29, 39 of PZTs 22, 32 to a much larger lateral movement at gimbal tongue 40 and hence at the center of head slider 42 and also at the particular loci where the read and write magnetic data transducers are located within head slider 42. Additionally, because the $d_{15}$ (shear) coefficient of PZT devices is generally higher than the $d_{31}$ (linear) coefficient, using shear-mode PZTs, particularly coupled with a mechanical coupling such as the one disclosed herein to amplify the shear movement of the PZTs, produces a large stroke length, which is the highly desired result.

The PZTs are poled and mounted such that a single common activation voltage applied to the top electrodes at top surfaces 29 and 39 causes PZT 22 to shear in the forward direction indicated by the arrow in FIG. 7A, and PZT 32 to simultaneously shear in the backward direction indicated by the arrow in FIG. 7B. That is, the top surface 29 of PZT 22 moves towards gimbal tongue 40 thus pushing a first side of gimbal tongue 40, and the top surface 39 of PZT 32 moves away from gimbal tongue 40 thus pulling a second side of the tongue that is laterally opposite the first side. When that happens, the mechanical coupling including connector 50 causes the head slider to rotate, which moves the data read and data write transducers embedded within the head slider across the data disk laterally, i.e., in a direction that is perpendicular to the data tracks on the disk. The rotational motion of the gimbal tongue therefore causes the head slider to be positioned properly over the data track, or moved to a different data track altogether.

In the embodiment, a proximal tail portion 41 of gimbal tongue 40 extends between the two PZTs 22, 32, such as at least as far as the midpoint of PZTs 22, 32. Tail portion 41 can provide moment-balancing for gimbal tongue 40. Furthermore, tail portion 41 may be formed such as by bending to interact with other features of the flexure to act as a vertical travel limiter for head slider 42.

Figure 9:
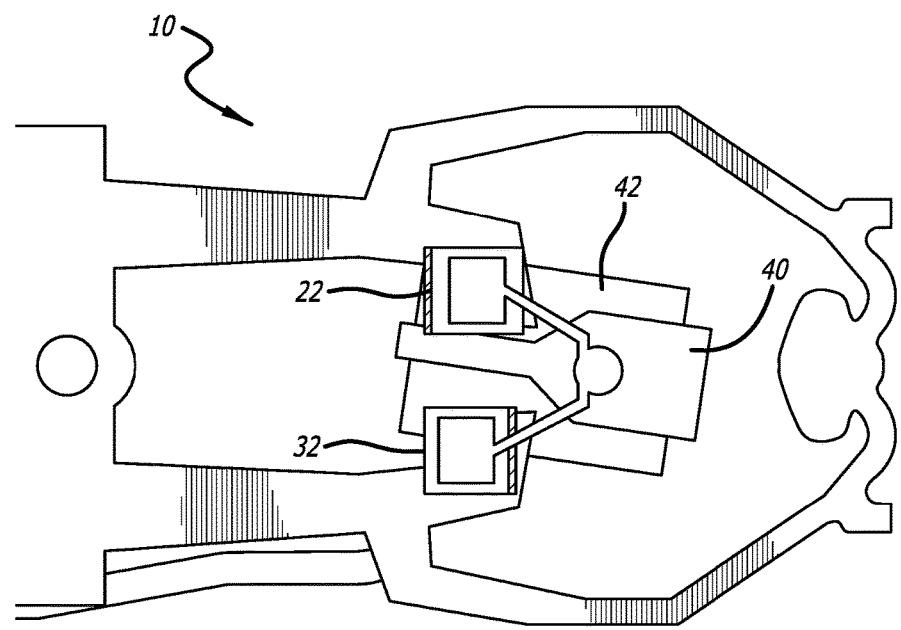
FIG. 9 is a top plan view of the flexure of FIG. 4 when the PZTs are activated.

FIG. 9 is a top plan view of the flexure of FIG. 4 when the PZTs are activated such as shown in FIGS. 7A and 7B. The top surface of PZT 22 has moved in shear toward the distal end of the suspension, and the bottom surface of PZT 32 has moved in shear toward the proximal end of the suspension. Acting through connector 50, the shear movement of the PZTs acts in push/pull fashion to rotate gimbal tongue 40 and hence head slider 42. The magnetic read/write transducers (not shown) that are embedded in head slider 42 therefore move with a radial component across the concentric data tracks on the data disk (not shown) within the disk drive assembly.

It will be understood that the terms "generally," "approximately," "about," and "substantially," as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will also be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, a suspension could employ only a single PZT, and/or could employ mechanical coupling mechanisms other than the exemplary coupling mechanism shown in the drawings. Accordingly, it is to be understood that the detailed description and the accompanying drawings as set forth hereinabove are not intended to limit the breadth of the present invention, which should be inferred only from the following claims and their appropriately construed legal equivalents.

I claim:

1. A dual stage actuated suspension for a disk drive, comprising:
   a beam portion;
   a flexure mounted to the beam portion, the flexure including:
     first and second flexible outrigger arms extending on respective lateral sides of the flexure from a relatively fixed portion of the flexure; and
     a gimbal tongue;
   a head slider mounted to the gimbal tongue for writing data to, and reading data from, a moving data medium containing a plurality of data tracks thereon;
   a first shear-mode piezoelectric device mounted at a distal end of the first flexible outrigger arm, the first shear-mode piezoelectric device having a top surface, a bottom surface, and two electrodes, the top surface moving in a linear shear direction relative to the bottom surface when an actuation voltage is applied across the electrodes, the bottom surface coupled with the distal end of the first flexible outrigger arm; and a mechanical coupling that, in response to the piezoelectric device being activated, couples the shear movement of the piezoelectric device to rotational movement of the head slider, the top surface of the piezoelectric device coupled with the mechanical coupling.

2. The suspension of claim 1 further comprising:
a second shear-mode piezoelectric device mounted at a distal end of the second flexible outrigger arm, the second shear-mode piezoelectric device having a top surface and a bottom surface;
wherein when the first and second piezoelectric devices are actuated, the top surface of the first piezoelectric devices moves in a first direction and the top surface of the second piezoelectric devices moves in a second direction generally opposite the first direction such that the two piezoelectric devices operate in push-pull fashion to produce push-pull movement, the mechanical coupling translating the push-pull movement of the shear-mode piezoelectric devices to rotate the head slider.

3. The suspension of claim 1 wherein the mechanical coupling multiplies movement of the piezoelectric device so as to cause a small movement of the piezoelectric device to produce a relatively larger movement at a center of the head slider.

4. The suspension of claim 1 wherein the gimbal tongue is supported only by said mechanical coupling.

5. A dual stage actuated suspension for a disk drive, comprising:
a beam portion;
a gimbaled portion including a gimbal tongue supported at a distal end of the beam portion;
a head slider for writing data to, and reading data from, a moving data medium containing a plurality of data tracks thereon, the head slider including at least one data transducer, the head slider being rigidly affixed to the gimbal tongue;
a shear-mode piezoelectric device having a top surface, a bottom surface, and at least two electrodes, the top surface moving in a linear shear direction relative to the bottom surface when an actuation voltage is applied across the electrodes; and
a mechanical coupling that, in response to the piezoelectric device being activated, couples the shear movement of the piezoelectric device to rotational movement of the head slider, the mechanical coupling comprising:
an elongate flexible arm having proximal and distal ends thereof, the proximal end being respectively affixed to the piezoelectric device and the distal end being affixed to the gimbal tongue.

6. The suspension of claim 5 wherein:
the shear-mode piezoelectric device and the elongate flexible arm respectively define a first shear-mode piezoelectric device and a first flexible arm; and
the suspension further comprises:
a second shear-mode piezoelectric device; and
a second elongate flexible arm extending from the second shear-mode piezoelectric device to the gimbal tongue; and
the gimbal tongue is supported only by the elongate flexible arms.

7. The suspension of claim 6 wherein:
the first and second piezoelectric devices are mounted on respective first and second flexible outrigger arms extending from a relatively fixed portion of the suspension; and
freedom of movement provided by the flexible outrigger arms combined with freedom of movement provided by the elongate flexible arms provide gimbaling action that allows the head slider to pitch and roll freely.

8. The suspension of claim 6 wherein the gimbal tongue has a proximal tail that extends rearwardly at least as far as a midpoint of the first and second shear-mode piezoelectric devices.

9. A dual stage actuated suspension for a disk drive, comprising:
a beam portion;
a flexure mounted to the beam portion, the flexure including a gimbal tongue and a head slider mounted to the gimbal tongue for writing data to, and reading data from, a moving data medium, the gimbal tongue being gimbaled on the flexure to allow the head slider to pitch and roll as the moving data medium moves underneath the head slider;
first and second shear-mode piezoelectric devices flexibly mounted to the flexure such that said first and second shear-mode piezoelectric devices have freedom of movement to move vertically without being rigidly coupled to each other in the vertical dimension;
a mechanical coupling arranged so that activation of the first piezoelectric device causes a pushing force to be exerted on a first side of the gimbal tongue at the same time that activation of the second piezoelectric devices causes a pulling force to be exerted on a second side of the gimbal tongue opposite the first side, the simultaneous pushing and pulling forces on the gimbal tongue causing the gimbal tongue to rotate.

10. The suspension of claim 9 wherein the first and second piezoelectric devices are separately supported such that the first piezoelectric device can move vertically relative to the second piezoelectric device.

11. The suspension of claim 9 wherein the gimbal tongue is supported only by flexible connectors extending from the first and second piezoelectric devices to the gimbal tongue.

12. The suspension of claim 11 wherein each of the flexible connectors has a width that is less than one third a lateral width of each of the piezoelectric devices.

13. A dual stage actuated suspension for a disk drive, comprising:
a beam;
a flexure mounted to the beam, the flexure including a gimbal tongue and a head slider mounted thereto for writing data to, and reading data from, a moving data medium, the gimbal tongue being gimbaled on the flexure to allow the head slider to pitch and roll as the moving data medium moves underneath the head slider;
a shear-mode piezoelectric device mounted to the flexure; and
a flexible connector extending from the shear-mode piezoelectric device to the gimbal tongue;
wherein when the piezoelectric device is actuated:
the shear-mode piezoelectric device moves the flexible connector in a first longitudinal direction; and
the movement of the flexible connector causes the head slider to rotate.

14. The suspension of claim 13 wherein:
the shear-mode piezoelectric device and the flexible connector respectively define a first shear-mode piezoelectric device and a first flexible connector; and
the suspension further comprises:
- a second shear-mode piezoelectric device mounted to the flexure; and
- a second flexible connector extending from the second shear-mode piezoelectric device to the gimbal tongue;
- wherein when the second piezoelectric device is activated:
  - the second shear-mode piezoelectric device moves the second flexible connector in a second longitudinal direction opposite the first longitudinal direction.

15. The suspension of claim 14 wherein the two flexible connectors are unitarily formed of a single piece of material, and connect to the gimbal tongue at a single location.

16. The suspension of claim 15 wherein the gimbal tongue is supported only by at least one of the first flexible connector and the second flexible connector.

17. The suspension of claim 14 wherein the two flexible connectors are unitarily formed of a single piece of stainless steel and carry a common driving voltage to the two piezoelectric devices.

18. The suspension of claim 14 further comprising a standoff that separates at least one of the first flexible connector and the second flexible connector from a surface of the gimbal tongue by a distance that approximately equals a thickness of the first piezoelectric device.

19. The suspension of claim 14 wherein each of the first and the second flexible connectors has a width that is less than one third a lateral width of each of the piezoelectric devices.

20. The suspension of claim 14 wherein as the flexible connectors extend distally from the piezoelectric devices, they also extend laterally inwardly toward a central longitudinal axis of the flexure.

* * * * *